United States Patent
Oliver et al.

(10) Patent No.: US 9,185,538 B2
(45) Date of Patent: Nov. 10, 2015

(54) WIRELESS SUBSCRIBER APPLICATION AND CONTENT DISTRIBUTION AND DIFFERENTIATED PRICING

(75) Inventors: Mitchell B. Oliver, San Diego, CA (US); Gerald Charles Horel, Brentwood Bay (CA); Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1166 days.

(21) Appl. No.: 11/141,934

(22) Filed: May 31, 2005

(65) Prior Publication Data

US 2006/0271449 A1    Nov. 30, 2006

(51) Int. Cl.
| | |
|---|---|
| H04W 4/24 | (2009.01) |
| G06Q 20/12 | (2012.01) |
| G06Q 20/32 | (2012.01) |
| G06Q 30/06 | (2012.01) |
| H04W 4/26 | (2009.01) |

(52) U.S. Cl.
CPC .............. *H04W 4/24* (2013.01); *G06Q 20/123* (2013.01); *G06Q 20/322* (2013.01); *G06Q 30/06* (2013.01); *G06Q 30/0641* (2013.01); *H04M 2215/2026* (2013.01); *H04M 2215/32* (2013.01); *H04W 4/26* (2013.01)

(58) Field of Classification Search
CPC .................................................. G06Q 30/0603
USPC ..................................................... 705/26–27
See application file for complete search history.

(56) References Cited

U.S. PATENT DOCUMENTS

| | | | |
|---|---|---|---|
| 628,294 A | | 7/1899 | Ira |
| 4,156,903 A | * | 5/1979 | Barton et al. ................. 707/100 |
| 4,975,942 A | | 12/1990 | Zebryk |
| 5,005,122 A | | 4/1991 | Griffin et al. |
| 5,329,619 A | | 7/1994 | Page et al. |
| 5,564,070 A | | 10/1996 | Want et al. |
| 5,608,781 A | | 3/1997 | Seiderman |
| 5,619,247 A | | 4/1997 | Russo |
| 5,634,012 A | | 5/1997 | Stefik et al. |
| 5,666,293 A | | 9/1997 | Metz et al. |

(Continued)

FOREIGN PATENT DOCUMENTS

| | | |
|---|---|---|
| CA | 2267549 A1 | 9/2000 |
| CA | 2363220 A1 | 5/2003 |

(Continued)

OTHER PUBLICATIONS

Arar, Yardena; "Download apps to a phone," PC World, Jun. 2002, v20i6pg64; Proquest #120993020, 3pgs.*

(Continued)

*Primary Examiner* — Rob Pond
(74) *Attorney, Agent, or Firm* — Satheesh K. Karra (57) ABSTRACT

Systems and methods for pricing and distributing applications and content to a wireless client device are disclosed. A first group can be formed by associating at least one item from a main catalog with a first subscriber ID (SID) associated with a first client device. A shopping catalog can be generated for the first client device from the main catalog based on at least one of platform ID, runtime API, and language. The first group can be included with the shopping catalog based on a first SID associated with the first client device. The pricing of the same item can be different in the first group and the main catalog.

28 Claims, 4 Drawing Sheets

(56) References Cited

U.S. PATENT DOCUMENTS

| | | | |
|---|---|---|---|
| 5,666,397 A | 9/1997 | Lamons et al. | |
| 5,761,485 A | 6/1998 | Munyan | |
| 5,812,988 A | 9/1998 | Sandretto | |
| 5,845,267 A | 12/1998 | Ronen | |
| 5,852,812 A | 12/1998 | Reeder | |
| 5,857,201 A | 1/1999 | Wright et al. | |
| 5,907,837 A * | 5/1999 | Ferrel et al. | 707/3 |
| 5,940,752 A | 8/1999 | Henrick | |
| 5,956,034 A | 9/1999 | Sachs et al. | |
| 5,970,490 A | 10/1999 | Morgenstern | |
| 5,986,690 A | 11/1999 | Hendricks | |
| 6,035,281 A | 3/2000 | Crosskey et al. | |
| 6,047,051 A | 4/2000 | Ginzboorg et al. | |
| 6,088,717 A | 7/2000 | Reed et al. | |
| 6,141,404 A | 10/2000 | Westerlage et al. | |
| 6,151,606 A | 11/2000 | Mendez | |
| 6,181,704 B1 | 1/2001 | Drottar et al. | |
| 6,185,198 B1 | 2/2001 | LaDue | |
| 6,185,683 B1 | 2/2001 | Ginter et al. | |
| 6,202,051 B1 | 3/2001 | Woolston | |
| 6,226,618 B1 | 5/2001 | Downs et al. | |
| 6,230,168 B1 | 5/2001 | Unger et al. | |
| 6,230,269 B1 | 5/2001 | Spies et al. | |
| 6,253,189 B1 | 6/2001 | Feezell et al. | |
| 6,253,239 B1 | 6/2001 | Shklar et al. | |
| 6,253,326 B1 | 6/2001 | Lincke et al. | |
| 6,263,326 B1 | 7/2001 | Chandra | |
| 6,263,362 B1 | 7/2001 | Donoho et al. | |
| 6,266,401 B1 | 7/2001 | Marchbanks et al. | |
| 6,269,157 B1 | 7/2001 | Coyle | |
| 6,282,294 B1 | 8/2001 | Deo et al. | |
| 6,311,223 B1 | 10/2001 | Bodin et al. | |
| 6,321,078 B1 | 11/2001 | Menelli et al. | |
| 6,324,565 B1 | 11/2001 | Holt, III | |
| 6,327,574 B1 | 12/2001 | Kramer et al. | |
| 6,334,114 B1 | 12/2001 | Jacobs et al. | |
| 6,334,116 B1 | 12/2001 | Ganesan et al. | |
| 6,336,137 B1 | 1/2002 | Lee et al. | |
| 6,343,318 B1 | 1/2002 | Hawkins et al. | |
| 6,366,893 B2 | 4/2002 | Hannula et al. | |
| 6,381,325 B1 | 4/2002 | Hanson | |
| 6,389,464 B1 | 5/2002 | Krishnamurthy et al. | |
| 6,427,076 B2 | 7/2002 | Skog | |
| 6,434,535 B1 | 8/2002 | Kupka et al. | |
| 6,453,160 B1 | 9/2002 | Thomas et al. | |
| 6,460,076 B1 | 10/2002 | Srinivasan | |
| 6,463,534 B1 | 10/2002 | Geiger et al. | |
| 6,493,722 B1 | 12/2002 | Daleen et al. | |
| 6,535,726 B1 | 3/2003 | Johnson | |
| 6,549,770 B1 | 4/2003 | Marran | |
| 6,597,903 B1 * | 7/2003 | Dahm et al. | 455/405 |
| 6,598,026 B1 | 7/2003 | Ojha et al. | |
| 6,606,744 B1 | 8/2003 | Mikurak | |
| 6,622,017 B1 | 9/2003 | Hoffman | |
| 6,628,934 B2 | 9/2003 | Rosenberg et al. | |
| 6,665,711 B1 | 12/2003 | Boyle et al. | |
| 6,683,941 B2 | 1/2004 | Brown et al. | |
| 6,704,716 B1 | 3/2004 | Force | |
| 6,721,716 B1 | 4/2004 | Gross | |
| 6,741,980 B1 | 5/2004 | Langseth et al. | |
| 6,742,043 B1 | 5/2004 | Moussa et al. | |
| 6,754,320 B2 | 6/2004 | Daase et al. | |
| 6,757,710 B2 | 6/2004 | Reed | |
| 6,792,271 B1 | 9/2004 | Sherman et al. | |
| 6,792,280 B1 | 9/2004 | Hori et al. | |
| 6,816,721 B1 | 11/2004 | Rudisill | |
| 6,820,121 B1 | 11/2004 | Callis et al. | |
| 6,857,067 B2 | 2/2005 | Edelman | |
| 6,873,936 B2 | 3/2005 | Reed et al. | |
| 6,880,750 B2 | 4/2005 | Pentel | |
| 6,883,142 B2 | 4/2005 | Shimamoto et al. | |
| 6,928,441 B2 * | 8/2005 | Haegele | 707/9 |
| 6,937,996 B1 | 8/2005 | Forsythe et al. | |
| 6,941,139 B2 | 9/2005 | Shupe et al. | |
| 6,941,270 B1 | 9/2005 | Hannula | |
| 6,954,793 B2 | 10/2005 | Ramaswamy et al. | |
| 6,955,883 B2 | 10/2005 | Margus et al. | |
| 6,957,793 B2 | 10/2005 | Gautier et al. | |
| 6,965,883 B2 | 11/2005 | Xu et al. | |
| 6,978,273 B1 * | 12/2005 | Bonneau et al. | 707/102 |
| 6,985,882 B1 | 1/2006 | Del Sesto | |
| 6,996,537 B2 | 2/2006 | Minear et al. | |
| 7,010,303 B2 | 3/2006 | Lewis et al. | |
| 7,010,500 B2 | 3/2006 | Aarnio | |
| 7,013,289 B2 | 3/2006 | Horn et al. | |
| 7,020,688 B2 | 3/2006 | Sykes, Jr. | |
| 7,039,389 B2 | 5/2006 | Johnson, Jr. | |
| 7,043,447 B2 | 5/2006 | Hughes et al. | |
| 7,047,405 B2 | 5/2006 | Mauro | |
| 7,068,680 B1 | 6/2006 | Kaltenmark et al. | |
| 7,099,891 B2 | 8/2006 | Harris et al. | |
| 7,113,766 B2 | 9/2006 | Horel et al. | |
| 7,117,504 B2 | 10/2006 | Smith et al. | |
| 7,155,205 B2 | 12/2006 | Cerami et al. | |
| 7,177,837 B2 | 2/2007 | Pegaz-Paquet et al. | |
| 7,184,747 B2 | 2/2007 | Bogat | |
| 7,200,566 B1 | 4/2007 | Moore et al. | |
| 7,206,842 B2 | 4/2007 | Nainani et al. | |
| 7,218,917 B2 | 5/2007 | Pradhan et al. | |
| 7,228,333 B1 | 6/2007 | Smith | |
| 7,233,790 B2 * | 6/2007 | Kjellberg et al. | 455/419 |
| 7,260,194 B1 | 8/2007 | Meyers et al. | |
| 7,269,654 B2 | 9/2007 | Srinivas | |
| 7,278,164 B2 | 10/2007 | Raiz et al. | |
| 7,286,655 B2 | 10/2007 | Voorman et al. | |
| 7,293,099 B1 | 11/2007 | Kalajan | |
| 7,334,025 B2 | 2/2008 | Kuriya | |
| 7,362,745 B1 | 4/2008 | Cope et al. | |
| 7,370,120 B2 | 5/2008 | Kirsch et al. | |
| 7,404,148 B2 | 7/2008 | Lincke et al. | |
| 7,415,439 B2 | 8/2008 | Kontio et al. | |
| 7,436,816 B2 | 10/2008 | Mehta et al. | |
| 7,444,411 B2 | 10/2008 | Sung et al. | |
| 7,461,067 B2 * | 12/2008 | Dewing et al. | |
| 7,467,198 B2 | 12/2008 | Goodman et al. | |
| 7,490,045 B1 | 2/2009 | Flores et al. | |
| 7,526,450 B2 | 4/2009 | Hughes et al. | |
| 7,574,377 B2 | 8/2009 | Carapelli | |
| 7,577,616 B2 | 8/2009 | Zhu | |
| 7,583,953 B2 | 9/2009 | Choi et al. | |
| 7,660,755 B2 | 2/2010 | Amato et al. | |
| 7,711,680 B2 | 5/2010 | Barnes-Leon et al. | |
| 7,752,217 B2 | 7/2010 | Sawashima et al. | |
| 7,894,803 B2 | 2/2011 | Kamada | |
| 7,904,528 B2 | 3/2011 | Zilliacus et al. | |
| 7,907,937 B2 | 3/2011 | Engelhart | |
| 8,028,056 B1 | 9/2011 | Krishna et al. | |
| 8,150,736 B2 | 4/2012 | Horn et al. | |
| 8,489,470 B2 | 7/2013 | Kahlon et al. | |
| 2001/0013020 A1 | 8/2001 | Yoshida et al. | |
| 2001/0032254 A1 | 10/2001 | Hawkins | |
| 2001/0034686 A1 | 10/2001 | Eder | |
| 2001/0036271 A1 | 11/2001 | Javed | |
| 2001/0037192 A1 * | 11/2001 | Shimamoto et al. | 704/8 |
| 2001/0037304 A1 | 11/2001 | Paiz | |
| 2001/0056362 A1 | 12/2001 | Hanagan et al. | |
| 2002/0002603 A1 | 1/2002 | Vange | |
| 2002/0004935 A1 | 1/2002 | Huotari et al. | |
| 2002/0019764 A1 | 2/2002 | Mascarenhas | |
| 2002/0022971 A1 | 2/2002 | Tanaka et al. | |
| 2002/0029197 A1 | 3/2002 | Kailamaki et al. | |
| 2002/0029200 A1 | 3/2002 | Dulin et al. | |
| 2002/0029347 A1 | 3/2002 | Edelman | |
| 2002/0035688 A1 | 3/2002 | Kutaragi et al. | |
| 2002/0035699 A1 | 3/2002 | Crosbie | |
| 2002/0038369 A1 | 3/2002 | Sung et al. | |
| 2002/0049717 A1 | 4/2002 | Routtenberg et al. | |
| 2002/0052754 A1 | 5/2002 | Joyce et al. | |
| 2002/0052968 A1 | 5/2002 | Bonefas et al. | |
| 2002/0062290 A1 | 5/2002 | Ricci | |
| 2002/0069176 A1 | 6/2002 | Newman | |
| 2002/0069244 A1 | 6/2002 | Blair et al. | |
| 2002/0069263 A1 | 6/2002 | Sears et al. | |
| 2002/0071559 A1 | 6/2002 | Christensen et al. | |

(56) References Cited

U.S. PATENT DOCUMENTS

| | | |
|---|---|---|
| 2002/0083006 A1 | 6/2002 | Headings et al. |
| 2002/0083050 A1 | 6/2002 | Liu et al. |
| 2002/0107706 A1 | 8/2002 | Oliver et al. |
| 2002/0107795 A1 | 8/2002 | Minear et al. |
| 2002/0107809 A1 | 8/2002 | Biddle |
| 2002/0109706 A1 | 8/2002 | Lincke et al. |
| 2002/0111904 A1 | 8/2002 | Gruber et al. |
| 2002/0128908 A1* | 9/2002 | Levin et al. ............... 705/14 |
| 2002/0128984 A1 | 9/2002 | Mehta et al. |
| 2002/0129108 A1 | 9/2002 | Sykes, Jr. |
| 2002/0129165 A1 | 9/2002 | Dingsor et al. |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1 | 10/2002 | Javed |
| 2002/0164025 A1 | 11/2002 | Raiz et al. |
| 2002/0165822 A1 | 11/2002 | Makipaa |
| 2002/0176553 A1 | 11/2002 | Aschir |
| 2002/0190120 A1 | 12/2002 | Pentel |
| 2002/0194143 A1 | 12/2002 | Banerjee et al. |
| 2002/0194357 A1 | 12/2002 | Harris et al. |
| 2003/0005136 A1 | 1/2003 | Eun |
| 2003/0023550 A1 | 1/2003 | Lee |
| 2003/0028903 A1 | 2/2003 | Hofrichter et al. |
| 2003/0033209 A1 | 2/2003 | Minear et al. |
| 2003/0046396 A1 | 3/2003 | Richter et al. |
| 2003/0051047 A1 | 3/2003 | Horel et al. |
| 2003/0060188 A1 | 3/2003 | Gidron et al. |
| 2003/0074328 A1 | 4/2003 | Schiff et al. |
| 2003/0078844 A1 | 4/2003 | Takatori et al. |
| 2003/0078886 A1 | 4/2003 | Minear et al. |
| 2003/0078895 A1 | 4/2003 | MacKay |
| 2003/0083973 A1 | 5/2003 | Horsfall |
| 2003/0083991 A1 | 5/2003 | Kikinis |
| 2003/0093461 A1 | 5/2003 | Suzuki et al. |
| 2003/0093565 A1 | 5/2003 | Berger et al. |
| 2003/0096591 A1 | 5/2003 | Pohutsky et al. |
| 2003/0110044 A1 | 6/2003 | Nix et al. |
| 2003/0110213 A1 | 6/2003 | Munetsugu et al. |
| 2003/0110296 A1 | 6/2003 | Kirsch et al. |
| 2003/0112927 A1 | 6/2003 | Brown et al. |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0172165 A1 | 9/2003 | Xu et al. |
| 2003/0176182 A1 | 9/2003 | Cerami et al. |
| 2003/0197719 A1 | 10/2003 | Lincke et al. |
| 2003/0208444 A1 | 11/2003 | Sauer |
| 2003/0208532 A1 | 11/2003 | Kuriya |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0002923 A1 | 1/2004 | Ramaswamy et al. |
| 2004/0006517 A1 | 1/2004 | Takatori |
| 2004/0015413 A1 | 1/2004 | Abu-Hejleh et al. |
| 2004/0015562 A1* | 1/2004 | Harper et al. .......... 709/217 |
| 2004/0030601 A1 | 2/2004 | Pond et al. |
| 2004/0032936 A1 | 2/2004 | Horel et al. |
| 2004/0043753 A1 | 3/2004 | Wake et al. |
| 2004/0044623 A1 | 3/2004 | Wake et al. |
| 2004/0116119 A1 | 6/2004 | Lewis et al. |
| 2004/0137890 A1 | 7/2004 | Kalke |
| 2004/0139012 A1 | 7/2004 | Koskinen et al. |
| 2004/0181591 A1 | 9/2004 | Yu et al. |
| 2004/0267630 A1 | 12/2004 | Au et al. |
| 2005/0027872 A1 | 2/2005 | Srinivas |
| 2005/0086348 A1 | 4/2005 | Balassanian |
| 2005/0090258 A1 | 4/2005 | Coppinger et al. |
| 2005/0113092 A1 | 5/2005 | Coppinger et al. |
| 2005/0114155 A1 | 5/2005 | Hodges et al. |
| 2005/0125315 A1 | 6/2005 | Munoz et al. |
| 2005/0132049 A1 | 6/2005 | Inoue et al. |
| 2005/0148319 A1 | 7/2005 | Himeno |
| 2005/0192878 A1 | 9/2005 | Minear et al. |
| 2005/0289047 A1 | 12/2005 | Oliver et al. |
| 2006/0014535 A1 | 1/2006 | Walker et al. |
| 2006/0015565 A1 | 1/2006 | Nainani et al. |
| 2006/0080232 A1 | 4/2006 | Epps |
| 2006/0143119 A1 | 6/2006 | Krueger et al. |
| 2006/0173758 A1 | 8/2006 | Minear et al. |
| 2006/0235931 A1 | 10/2006 | Ruthe et al. |
| 2006/0253350 A1 | 11/2006 | Falkenhain et al. |
| 2006/0270386 A1 | 11/2006 | Yu et al. |
| 2007/0003034 A1 | 1/2007 | Schultz et al. |
| 2007/0038703 A1 | 2/2007 | Tendjoukian et al. |
| 2007/0066279 A1 | 3/2007 | Silverbrook et al. |
| 2007/0083464 A1 | 4/2007 | Cordero Torres et al. |
| 2007/0123229 A1 | 5/2007 | Pousti |
| 2007/0169163 A1 | 7/2007 | Morio et al. |
| 2007/0174308 A1 | 7/2007 | Rausch |
| 2007/0197188 A1 | 8/2007 | Sprigg et al. |
| 2007/0197189 A1 | 8/2007 | Horel et al. |
| 2011/0030042 A1 | 2/2011 | Neal-Joslin |
| 2011/0143709 A1 | 6/2011 | Pousti |
| 2012/0309345 A1 | 12/2012 | Wake et al. |

FOREIGN PATENT DOCUMENTS

| | | |
|---|---|---|
| EP | 0780802 A2 | 6/1997 |
| EP | 0895148 A1 | 2/1999 |
| EP | 1026610 A2 | 8/2000 |
| EP | 1026853 A1 | 8/2000 |
| EP | 1033652 | 9/2000 |
| EP | 1047030 A2 | 10/2000 |
| EP | 1102191 A2 | 5/2001 |
| EP | 1122967 A2 | 8/2001 |
| EP | 1162807 A2 | 12/2001 |
| EP | 1204054 A2 | 5/2002 |
| EP | 1403797 A1 | 3/2004 |
| EP | 1404100 A1 | 3/2004 |
| EP | 1414185 A2 | 4/2004 |
| FR | 2775550 A1 | 9/1999 |
| GB | 2349548 A | 11/2000 |
| JP | 07044261 | 2/1995 |
| JP | 07319691 A | 12/1995 |
| JP | 9319573 A | 12/1997 |
| JP | 1066050 | 3/1998 |
| JP | 10140283 A | 5/1998 |
| JP | 10260873 A | 9/1998 |
| JP | 10262059 A | 9/1998 |
| JP | 11053185 A | 2/1999 |
| JP | 11055252 A | 2/1999 |
| JP | 11069017 A | 3/1999 |
| JP | 11126188 A | 5/1999 |
| JP | 200056967 | 2/2000 |
| JP | 2000078129 A | 3/2000 |
| JP | 2000357196 A | 12/2000 |
| JP | 2001195451 A | 7/2001 |
| JP | 2001202434 A | 7/2001 |
| JP | 2001243382 A | 9/2001 |
| JP | 2001250069 A | 9/2001 |
| JP | 2001265938 | 9/2001 |
| JP | 2001268623 A | 9/2001 |
| JP | 2001312324 A | 11/2001 |
| JP | 2001312666 A | 11/2001 |
| JP | 2001319168 A | 11/2001 |
| JP | 2001320509 A | 11/2001 |
| JP | 2001325234 | 11/2001 |
| JP | 2001352583 | 12/2001 |
| JP | 2002007839 A | 1/2002 |
| JP | 2002015160 A | 1/2002 |
| JP | 2002027151 A | 1/2002 |
| JP | 2002091850 A | 3/2002 |
| JP | 2002093361 A | 3/2002 |
| JP | 2002094450 A | 3/2002 |
| JP | 200299441 | 4/2002 |
| JP | 2002099289 A | 4/2002 |
| JP | 2002101315 A | 4/2002 |
| JP | 2002109395 A | 4/2002 |
| JP | 2002132367 | 5/2002 |
| JP | 2002133316 A | 5/2002 |
| JP | 2002163258 | 6/2002 |
| JP | 2002163467 A | 6/2002 |
| JP | 2002175387 A | 6/2002 |

(56) References Cited

FOREIGN PATENT DOCUMENTS

| | | |
|---|---|---|
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002353885 A | 12/2002 |
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2005537544 | 12/2005 |
| JP | 2006505966 A | 2/2006 |
| JP | 2006520173 | 8/2006 |
| JP | 2007527570 A | 9/2007 |
| JP | 2007319691 A | 12/2007 |
| JP | 2008514743 A | 5/2008 |
| JP | 2010178027 A | 8/2010 |
| KR | 200072521 | 12/2000 |
| KR | 20010078968 | 8/2001 |
| KR | 20020039648 | 5/2002 |
| KR | 2003-0042660 | 6/2003 |
| KR | 1020030050565 | 6/2003 |
| KR | 20030078446 | 10/2003 |
| KR | 20070007954 | 1/2007 |
| RU | 2165679 C1 | 4/2001 |
| RU | 2191482 C1 | 10/2002 |
| RU | 2212057 | 9/2003 |
| TW | 161301 | 6/1991 |
| TW | 388021 B | 4/2000 |
| TW | 466858 B | 12/2001 |
| TW | 499645 B | 8/2002 |
| WO | WO9308545 A1 | 4/1993 |
| WO | 9726739 A1 | 7/1997 |
| WO | 9745814 | 12/1997 |
| WO | WO9821676 | 5/1998 |
| WO | WO9931610 A1 | 6/1999 |
| WO | 9941861 A1 | 8/1999 |
| WO | 9952077 | 10/1999 |
| WO | WO-0002112 A2 | 1/2000 |
| WO | WO0031672 A1 | 6/2000 |
| WO | 0043962 A1 | 7/2000 |
| WO | WO0056033 A1 | 9/2000 |
| WO | 0079451 | 12/2000 |
| WO | 0143390 A2 | 6/2001 |
| WO | 0150305 A2 | 7/2001 |
| WO | WO-0149048 A1 | 7/2001 |
| WO | 0163900 A1 | 8/2001 |
| WO | WO0163532 | 8/2001 |
| WO | WO0169891 A1 | 9/2001 |
| WO | WO0197104 A1 | 12/2001 |
| WO | 0203219 A1 | 1/2002 |
| WO | 0231718 | 4/2002 |
| WO | WO0244892 A2 | 6/2002 |
| WO | WO02063536 A2 | 8/2002 |
| WO | WO02063537 A2 | 8/2002 |
| WO | WO02067600 A1 | 8/2002 |
| WO | WO-02073934 A2 | 9/2002 |
| WO | WO-02093361 A1 | 11/2002 |
| WO | WO-02103459 A2 | 12/2002 |
| WO | 03017171 A1 | 2/2003 |
| WO | 03032618 A1 | 4/2003 |
| WO | 03050743 A1 | 6/2003 |
| WO | 03075584 A2 | 9/2003 |
| WO | 03079256 A1 | 9/2003 |
| WO | WO-03085943 A1 | 10/2003 |
| WO | WO-2004003708 A2 | 1/2004 |
| WO | WO 2004021131 A2 | 3/2004 |
| WO | WO2004082245 | 9/2004 |
| WO | 2005004456 | 1/2005 |
| WO | 2005008383 A2 | 1/2005 |
| WO | WO2005020027 A2 | 3/2005 |
| WO | 2005069917 | 8/2005 |
| WO | WO-2006130539 A2 | 12/2006 |

OTHER PUBLICATIONS

Qualcomm: "Binary Runtime Environment for Wireless, BREW Application note: Developing BREW Applications for Devices with RUIM Units"[Online] Jan. 10, 2005, pp. 1-11, XP002410586 San Diego Retrieved from the Internet: URL:http://brew.qualcomm.com/brew_bnry/pdf/developer/resources/ds/Dev_BREW_Apps.pdf> [retrieved on Dec. 6, 2006] the whole document.

Qualcomm: BREW Distribution System (BDS) Overview [Online] 2003, pp. 1-17, XP002410587 San Diego Retrieved from the Internet: URL:http://www.wirelessknowledge.com/brew/images/about/pdf/bds.pdf> [retrieved on Dec. 6, 2006] the whole document.

International Search Report, PCT/US06/020706, International Search Authority European Patent Office, Dec. 18, 2006.

Office Action dated May 2, 2007, U.S. Appl. No. 11/141,807.

Amendment dated Aug. 8, 2007, U.S. Appl. No. 11/141,807.

Office Action dated Oct. 22, 2007, U.S. Appl. No. 11/141,807.

Amendment dated Dec. 23, 2007, U.S. Appl. No. 11/141,807.

Office Action dated Jan. 31, 2008, U.S. Appl. No. 11/141,807.

Amendment dated Oct. 14, 2008, U.S. Appl. No. 11/141,934.

Anonymous, "BPM in Action: iUniverse," Intelligent Enterprise, San Mateo, May 15, 2004, vol. 7, Issue 8, 2 pages. (recovered from ProQuest on Jun. 5, 2009).

Atsuyuki Morishima, "Efficient Construction of Materialized XML Views With Silkroute", IPSJ SIG Notes, Japan, Information Processing Society of Japan, Jul. 17, 2001, vol. 2001, No. 70, pp. 421-428.

Business Wire, Informix Announces Key Customer Wins in Fourth Quarter; Leading Companies and Government Entities in Key Markets Around the World Respond to Informer's Technology Strategy Business/Technology Editors. Business Wire. New York: Jan. 27, 1999, p. 1.

Butrico M A et al: "Gold Rush: Mobile Transaction Middleware With Java-Object Replication" Conference on Object-Oriented Technologies, (Jun. 16, 1997), pp. 91-101.

Diebold Teams with Health System Services to Offer a Complete Distribution Package for Pharmacy Medication and Supplies PR Newswire. New York: May 28, 1998. p. 1.

Goldenberg-Hart, Diane, "A Glossary of Selected Internet and Computing Terms," Yale University Library, Jun. 1996. Retrieved from http://www.library.yale.edu/ref/internet/intgloss.htm.

M2 Presswire. Convergys: Genie Mobile chooses Geneva Billing software, continuing the momentum of the merger between Convergys and Geneva Technology. Coventry: Jun. 1, 2001, p. 1.

"AvantGo 4.0 Powers Wireless Applications and Services, " Customer Inter@ction Solutions, May 2001, vol. 19, Issue 11, p. 71.

"Sony Pictures to Sell Movies via Internet," Jul. 9, 2001, Source: Japan Computer Industry Scan.

Office Action dated Jan. 7, 2009, U.S. Appl. No. 11/141,934.

Office Action dated Sep. 12, 2008, U.S. Appl. No. 11/141,934.

Office Action dated Jun. 12, 2008, U.S. Appl. No. 11/141,934.

Office Action dated Nov. 30, 2007, U.S. Appl. No. 11/141,934.

PR Newswire. China Unicom Selects Qualcomm's Brew Solution as Its Platform to Launch Wireless Data Applications. New York, Aug. 26, 2002, p.1.

Request for Reconsideration dated Aug. 12, 2008, U.S. Appl. No. 11/141,934.

Request for Reconsideration dated Mar. 4, 2008, U.S. Appl. No. 11/141,934.

Rigdon, Joan E., "CyberSource Begins to Offer Software of Symantec and Others on the Internet," Wall Street Journal, Jan. 31, 1995.

Statement in accordance with the Notice from the European Patent Office dated Oct. 1, 2007 concerning business methods, Official Journal of the European Patent Office, Nov. 1, 2007, pp. 592-593, European Patent Office, Munich, Germany, XP007905525.

(56) References Cited

OTHER PUBLICATIONS

SYNCML Consortium: "SYNCML Sync Protocol, Version 1.0" (Dec. 7, 2000), Chapters 1, 2, 5-8.

SYNCML Consortium: "SYNCML Sync Protocol, Version 1.0.1" (Jun. 15, 2001).

"SYNCML Representation Protocol, Version 1.0" SYNCML Representation Protocol, (Dec. 7, 2000), pp. 1-104, Chapters 1-4.

USA Group Selects Click-N-Done for Electronic Bill Presentment and Payment; Software Will Support Online Presentment and Payment for Education Loan Borrowers Business Editors, Internet Writers. Business Wire. New York: Apr. 24, 2000. p. 1.

Written Opinion—PCT/US06/020706, International Search Authority European Patent Office, Dec. 18, 2006.

European Search Report—EP10172294, Search Authority—Munich Patent Office, Nov. 25, 2010.

Fujii, H. "BREW application, flexibility in development comparable to PCs, powerful in enterprise system cooperation of cellular phones," Solution IT, vol. 14, No. 11, Japan, RIC Telecom, Nov. 1, 2002, pp. 22-24.

Translation of Office Action in Japan application 2004-531867 corresponding to U.S. Appl. No. 10/231,970.

Translation of Office Action in Japan application 2008-514743 corresponding to U.S. Appl. No. 11/141,807.

Anonymous: "BREW TM Application Note: Developing BREW Applications for Devices with RUIM Units", May 14, 2005, pp. 1-11, XP007920607, Retrieved from the Internet: URL:http://web.archive.org/web/20050514075656/http://brew.qualcomm.com/brew_bnry/pdf/developer/resources/ds/Dev_Brew_Apps.pdf.

Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_BREW_Apps.pdf [retrieved on Jun. 6, 2012].

Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.

"Ellipsus' Mobile Aplication Provisioning System", Internet Citation, Dec. 2, 2001, XP002266188, Retrieved from the Internet: URL: web.archive.orgfwww.ellipsus.com [retrieved on Jan. 7, 2004].

"How can wireless models help my business?", Computer Weekly, Dec. 2, 2003; p. 1-5, Available from: Business Source Complete, Ipswich, MA. Accessed Jul. 1, 2013.

Mcauliffe W., "Broadband heading for move to metered billing", New Media Age, Apr. 29, 2004; p. 1, Available from: Business Source Complete, Ipswich, MA. Accessed Jul. 1, 2013.

Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000, pp. 1-4, XP010538894, ISBN: 0-7803-6364-7.

Floyd R, et al., "Mobile Web Access Using Enetwork Web Express", IEEE Personal Communications, IEEE Communications Society, US, vol. 5, No. 5, Oct. 1, 1998, pp. 47-52, XP000786616.

Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

Classified Ad 3—No Title, New York Daily Times (1851-1857); Nov. 15, 1853; ProQuest Historical Newspapers: The New York Times (1851-2008) p. 4.

Classified Ad 74—No Title. Chicago Daily Tribune (1923-1963); Oct 11, 1959; ProQuest Historical Newspapers: Chicago Tribune (1849-1989) p. G34.

\* cited by examiner

Fig. 4

WIRELESS SUBSCRIBER APPLICATION AND CONTENT DISTRIBUTION AND DIFFERENTIATED PRICING

REFERENCE TO CO-PENDING APPLICATIONS FOR PATENT

The present Application for Patent is related to the following co-pending U.S. Patent Applications:

"WIRELESS SUBSCRIBER BILLING AND DISTRIBUTION" by Julie Yu, Mitchell Oliver, Jerry Horel, Phil Nguyen, Sandy Prast, and Jaiteerth Patwari, having filed concurrently herewith, assigned to the assignee hereof, and expressly incorporated by reference herein.

BACKGROUND OF THE INVENTION

1. Field

The present invention generally relates to communications between remote computing devices and servers. More particularly, the invention relates to the creation and sending of billing events between a server and a remote client device.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device, and in particular, the small size of the user input unit, e.g., the keyboard. Because of such severe resource constraints, it is often typically desirable, for example, to maintain a limited size and quantity of software applications and other information residing on such remote personal computing devices (client devices).

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless software (BREW®) developed by QUALCOMM, Inc., of San Diego, Calif. BREW® can cooperate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing BREW. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

The enhanced computing capabilities and security features in client devices has enabled applications to be purchased directly from a carrier network and downloaded and installed on to a client device. Once an application is purchased, a remote billing system can automatically generate billing to a subscriber/account associated with the client device and can distribute the appropriate payment to the developers/publishers. However, current wireless server-client systems provide for limited purchased options. Typically, a one-time purchase or a fixed number of uses can be purchased for a desired application or content. This results in limited flexibility for developers and content providers to package or up-sell their applications.

The foregoing description of the related art is merely intended to provide an overview of some of the known uses of APIs and as an introduction to the BREW® platform, which can be used in embodiments of the invention. However, the invention is not to be construed as being limited to a specific implementation, operating platform or environment.

SUMMARY OF THE EXEMPLARY EMBODIMENTS

Exemplary embodiments of the present invention are directed to a system and method for generating and processing billing requests in a wireless network.

Accordingly, an embodiment of the invention can include a method of distributing items to wireless client device comprising: forming at least one group by associating at least one item from a main catalog with a first subscriber ID (SID) associated with a first client device; generating a shopping catalog for the first client device from the main catalog based on at least one of platform ID, runtime API, and language; and including the at least one group and associated at least one item in the shopping catalog based on a first SID associated with the client device.

Another embodiment of the invention can include a server comprising: logic configured to form at least one group by associating at least one item from a main catalog with a first subscriber ID (SID) associated with a first client device; logic configured to generate a shopping catalog for the first client device from the main catalog based on at least one of platform ID, runtime API, and language; and logic configured to include a first group in the shopping catalog based on a first SID associated with the first client device.

Another embodiment of the invention can include an apparatus for distributing items to wireless client device comprising: means for forming at least one group by associating at least one item from a main catalog with at least one subscriber ID (SID); means for generating a shopping catalog for a first client device from the main catalog based on at least one of platform ID, runtime API, and language; and means for including the at least one group and associated at least one item in the shopping catalog based on a first SID associated with the client device.

Another embodiment of the invention can include an apparatus for distributing items to wireless client device comprising: means for forming at least one group by associating at least one item from a main catalog with at least one subscriber ID (SID); means for generating a shopping catalog for a first client device from the main catalog based on at least one of platform ID, runtime API, and language; and means for including the at least one group and associated at least one item in the shopping catalog based on a first SID associated with the client device.

Another embodiment of the invention can include a computer-readable medium on which is stored a computer program for wirelessly presenting and distributing items to a client device, the computer program comprising instructions which, when executed causes the computing device to perform the process of: forming at least one group by associating at least one item from a main catalog with a first SID associated with a first client device; generating a shopping catalog for the first client device from the main catalog based on at least one of platform ID, runtime API, and language; and including the at least one group and associated at least one item in the shopping catalog based on a first SID associated with the first client device.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment or platform executing on the computing device. One such runtime environment is Binary Runtime Environment for Wireless software (BREW®) previously discussed. However, one or more embodiments of the invention can be used with other types of runtime environments or platforms that, for example, operate to control the execution of applications on wireless client computing devices.

Additionally, it will be recognized to those skilled in the art that an application file type being distributed and executed may be describe herein for simplicity of description. However, an "application" may also include files having executable content, such as: object code, scripts, java file, a bookmark file (or PQA file), WML scripts, byte code, and perl scripts. In addition, an "application" referred to herein, may also include files that are not executable in nature, such as documents that may need to be opened or other data files that need to be accessed.

Figure 1:
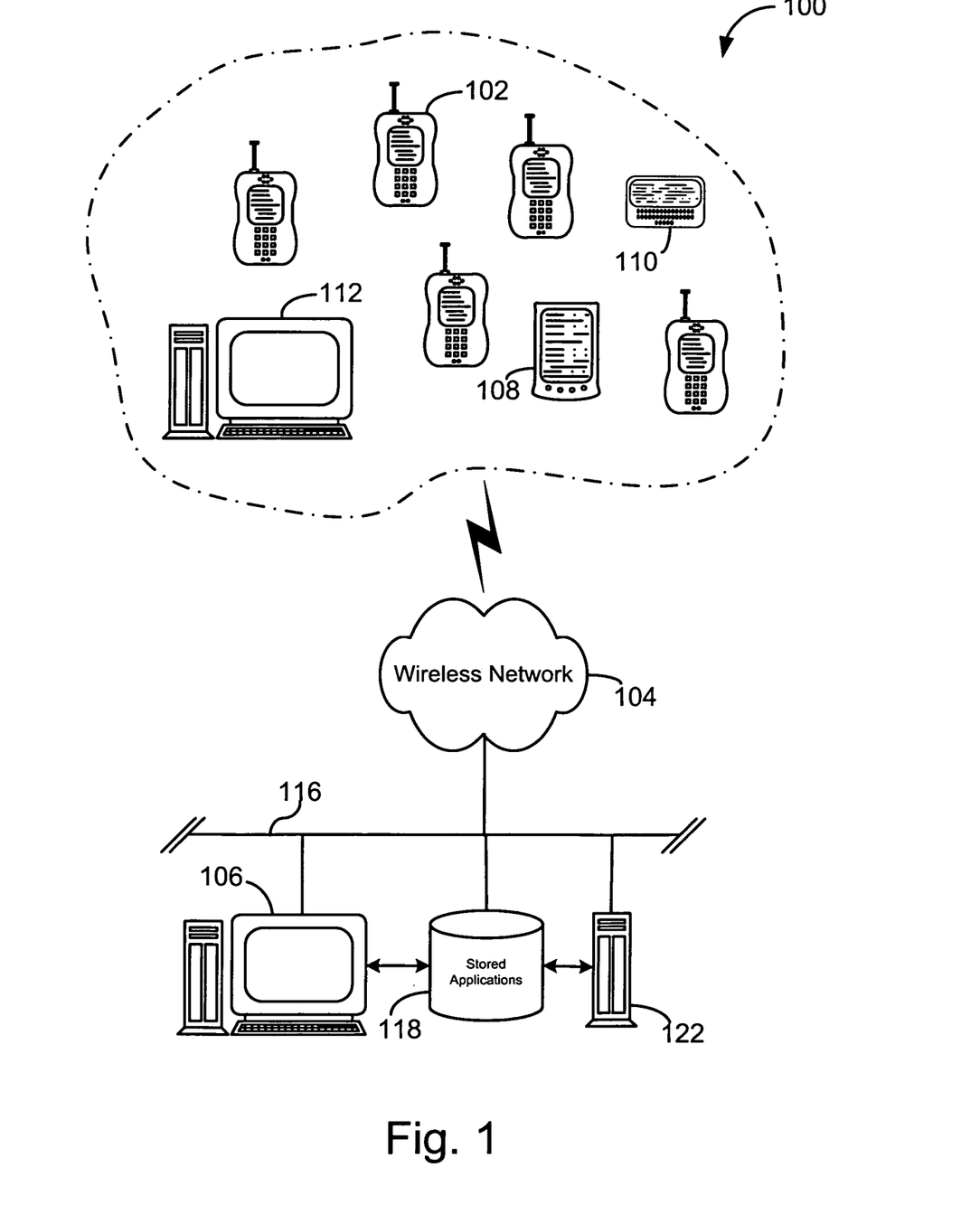
FIG. 1 is a diagram of a wireless network architecture that supports the client devices and servers in accordance with at least one embodiment of the invention.

FIG. 1 illustrates a block diagram of one exemplary embodiment of a wireless system 100 in accordance with at least one embodiment of the invention. System 100 can contain client devices, such as cellular telephone 102, in communication across a wireless network 104 with at least one application download server (ADS) 106 that selectively transmits software applications and components to wireless devices across a wireless communication portal or other data access to the wireless network 104. As shown here, the wireless (client) device can be a cellular telephone 102, a personal digital assistant 108, a pager 110, which is shown here as a two-way text pager, or even a separate computer platform 112 that has a wireless communication portal. The embodiments of the invention can thus be realized on any form of client device including a wireless communication portal or having wireless communication capabilities, including without limitation, wireless modems, PCMCIA cards, personal computers, access terminals, telephones, or any combination or subcombination thereof.

The application download server 106 is shown here on a network 116 with other computer elements in communication with the wireless network 104. There can be a stand-alone server 122, and each server can provide separate services and processes to the client devices 102, 108, 110, 112 across the wireless network 104. There is preferably also at least one stored application database 118 that holds the software applications and content which are downloadable by the wireless devices 102, 108, 110, 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality.

Figure 2:
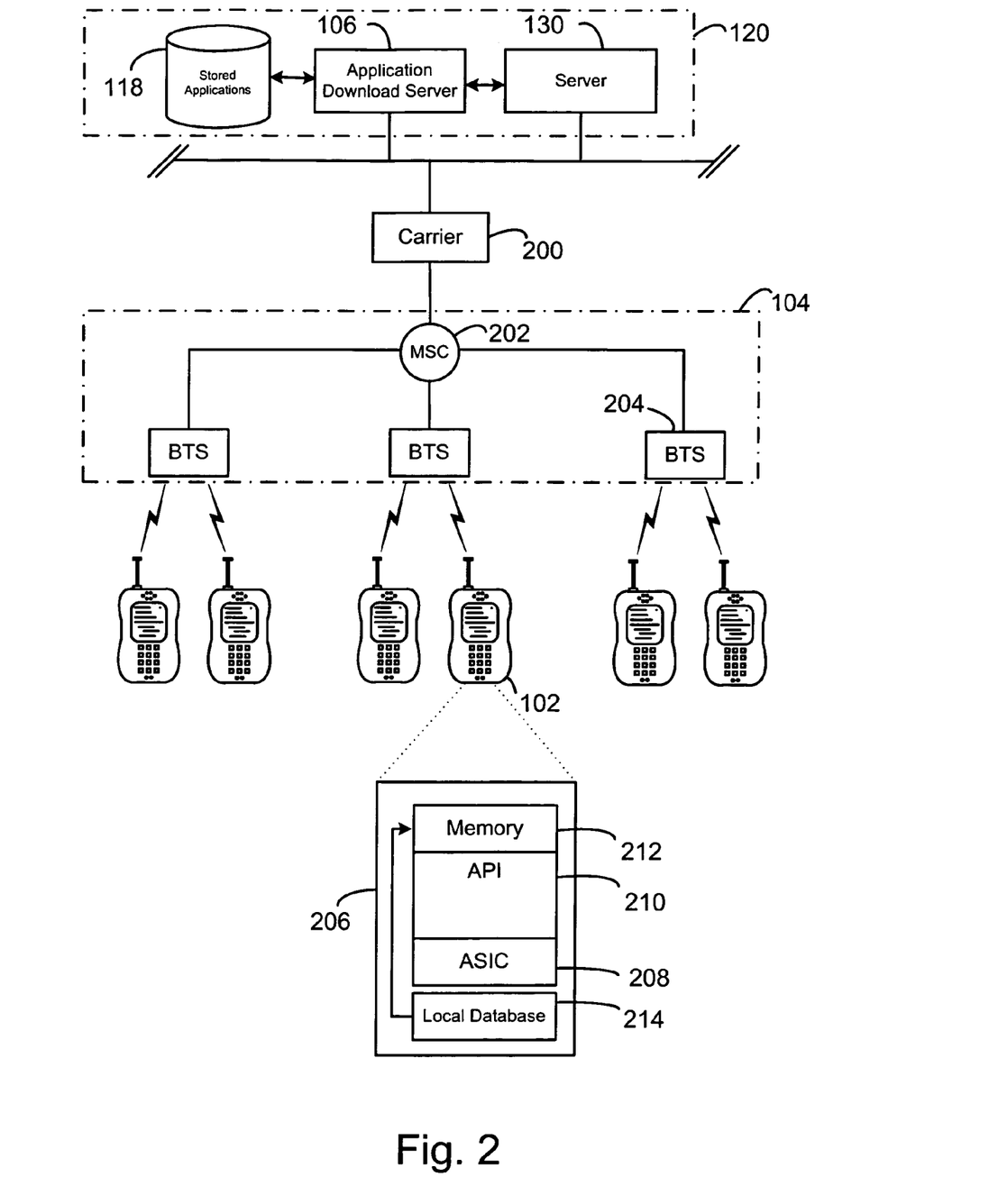
FIG. 2 is a more detailed diagram of a wireless network architecture that supports the client devices and servers in accordance with at least one embodiment of the invention.

In FIG. 2, a block diagram is shown that more fully illustrates system 100, including the components of the wireless network 104 and interrelation of the elements of the exemplary embodiments of the invention. System 100 is merely exemplary and can include any system that allows remote client devices, such as wireless client computing devices 102, 108, 110, 112 to communicate over-the-air between and among each other and/or between and among components connected via a wireless network 104, including, without limitation, wireless network carriers and/or servers. The application download server 106 and the stored application database 118, along with any other servers such as server 130 which can be used to provide cellular telecommunication services, communicate with a carrier network 200, through a data link, such as the Internet, a secure LAN, WAN, or other network. In the embodiment shown, a server 120 can include the application download server 106, billing server 130 and the stored application database 118. However, these servers can also be independent devices.

The carrier network 200 controls messages (typically sent as data packets) sent to a messaging service controller ("MSC") 202. The carrier network 200 communicates with the MSC 202,by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations ("BTS") 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service ("SMS"), or other over-the-air (OTA) methods known in the art.

The client device, (here a wireless client computing device), such as cellular telephone 102, has a computer platform 206 that can receive and execute software applications or content and/or commands transmitted from the application download server 106, server 130 and/or server 120. The computer platform 206 can include an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The computer platform 206 also includes a local database 214 that can hold applications not actively used in memory 212. The local database 214 is typically a flash memory cell, but can be any secondary storage device as known in the art, such as magnetic media, EEPROM, optical media, tape, soft or hard disk, and the like.

The wireless client computing device, such as cellular telephone 102, can have installed on it, or otherwise downloads, one or more software applications, such as games, news, stock monitors, and the like. For example, the cellular telephone 102 may receive one or more software applications and content downloaded from the download server 106. The software applications and content may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to application and content distribution between a client device and a server. The client computing device can be serviced by at least one remote server with respect processing the application and content distribution. Some examples of client devices which may be used in accordance with embodiments of the present invention include cellular telephones or other wireless communication units, PDAs, paging devices, handheld navigation devices, handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Application purchasing options in conventional wireless systems are controlled by the carrier/operator. Typically, a client device browses for applications and/or content, selects and downloads the application and/or content from lists presented from the carrier/operator. In a conventional system, the lists of applications and content presented (e.g., by an application download server (ADS)) to the user of the client device are derived from a main catalog that contains all the applications and content available for purchase/download to the client devices. The catalog is typically structured as a series of folders that organize the applications and content. The catalog then serves as a basis to generate a display of applications and content presented by the ADS to a subscriber for browsing and purchasing. The applications and content from the catalog are typically filtered based on the platform ID, runtime API (e.g., BREW® 3.0), and language (e.g., English), so that only the relevant applications and content are presented. This information is communicated between the client device and the ADS automatically, so that the ADS can present the appropriate applications and content. However, the conventional system will present the same catalog for all common client device configurations (e.g., platform, runtime API, and language). Accordingly, the,flexibility of customizing the shopping experience (e.g., item presentation, SID-directed items, pricing and the like) is limited in conventional systems.

Figure 3:
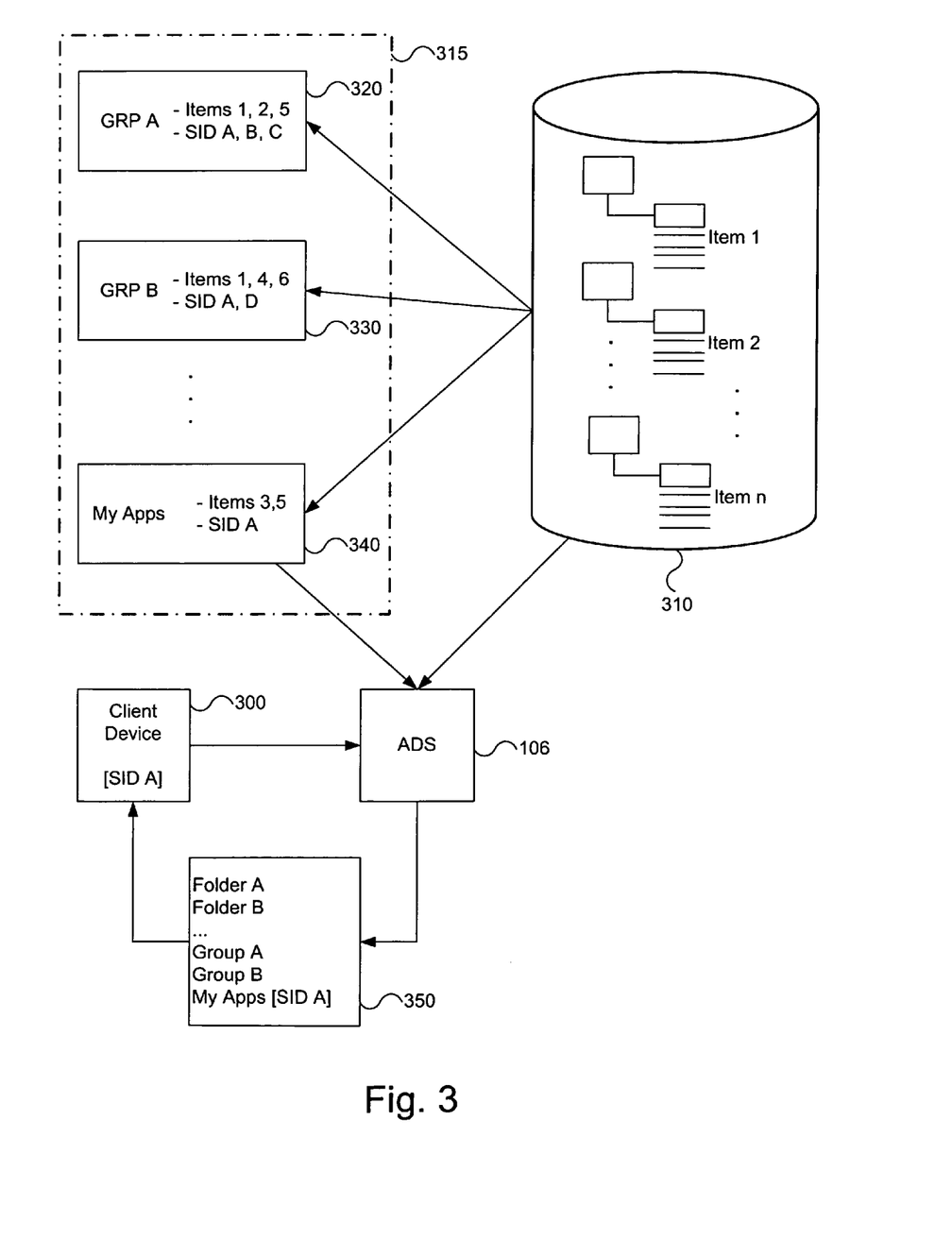
FIG. 3. is a system level illustration of an group distribution system in accordance with at least one embodiment of the invention.

FIG. 3 illustrates a system diagram of group distribution in accordance with at least one embodiment of the present invention. The main catalog 310 contains a plurality of items (e.g., applications, content). At least one group (e.g., 320, 330, 340) is formed by a group manager API 315 by associating at least one item from a main catalog 310 with at least one subscriber ID (SID). However, multiple items, as illustrated, can be associated with each group (320, 330, 340) and one item can be associated with more than one group. Further, each SID can be associated with one or more groups, as illustrated. Additionally, a group 340 that contains only one SID (e.g., a My Apps) group can be formed that contains items that are specifically directed to that SID. Each group can contain an item or items which are also contained in the main catalog, but are hidden from the general consumer directory, so that the items are only displayed via that group and are not accessible through the main catalog (e.g., a common commercial catalog).

Accordingly, a shopping catalog 350 can be generated for a client device 300 from a main catalog 310 based on platform ID, runtime API, and language, in a conventional manner (e.g., using folders/items from main catalog 310), as discussed above. However, the shopping catalog 350 can be augmented by including each group and items in each group (e.g., 320 (Group A), 330 (Group B), 340 (My Apps)) associated with a SID in the shopping catalog 350 based on the SID associated with the client device 300. Therefore, the shopping catalog 350 is customizable for each SID. Typically, the shopping catalog is generated via the ADS 106, which can use the SID, platform ID, runtime API, and language to generate the SID specific shopping catalog 350.

In addition to presenting items in an alternative manner, associating SIDs with specific groups (320, 330, 340) that are derived from the main catalog 310 allows for differentiated pricing for the same item. For example, item 5 (e.g., an application) in the main catalog 310 can be offered for a full commercial price of $10.00. However, in Group A 320, which may be associated with a particular carrier price plan, item 5 may be included and can be offered at a reduced price of $8.00 (e.g., higher monthly carrier subscriptions may have associated with them lower priced content/applications). Further, the same item 5 can be contained in a SID-directed group 340 (My Apps) which may be offered for free. For example, item 5 may have been prepaid or a gift from another subscriber.

Accordingly an embodiment of the invention includes a server (e.g., ADS 106 and/or group manager 315) including logic configured to form at least one group by associating at least one item from a main catalog with at least one SID. The server also includes logic configured to generate a shopping catalog for a client device from a main catalog based on at least one of platform ID, runtime API, and language. Further, the server can include logic configured to include the at least one group in the shopping catalog based on a SID associated with the client device. The server can also include logic configured to associate a first price structure with a first item (e.g., item 5) in a first group (e.g., 320, 340) that is different from a main price structure (e.g., retail price) associated with the first item (e.g., item 5) in the main catalog 310. Each price structures can include at least one of a list price and a provider price. For example, the list price can be the amount billed to the subscriber and the provider price can be the amount paid to the application developer of an application/content distributor purchased and downloaded. However, other pricing information can be included such as multiple source fees if the item is supplied from multiple sources (e.g., developers, publishers and the like). Typically, in the multiple source configurations the sum of the source fees does not exceed the content price/fee. The various price structures provide for differentiated pricing for the same application/content based on SID and can facilitate accurate billing of the subscriber and settlement with the application developers/content providers, since the price paid to each can be included in each price structure.

Figure 4:
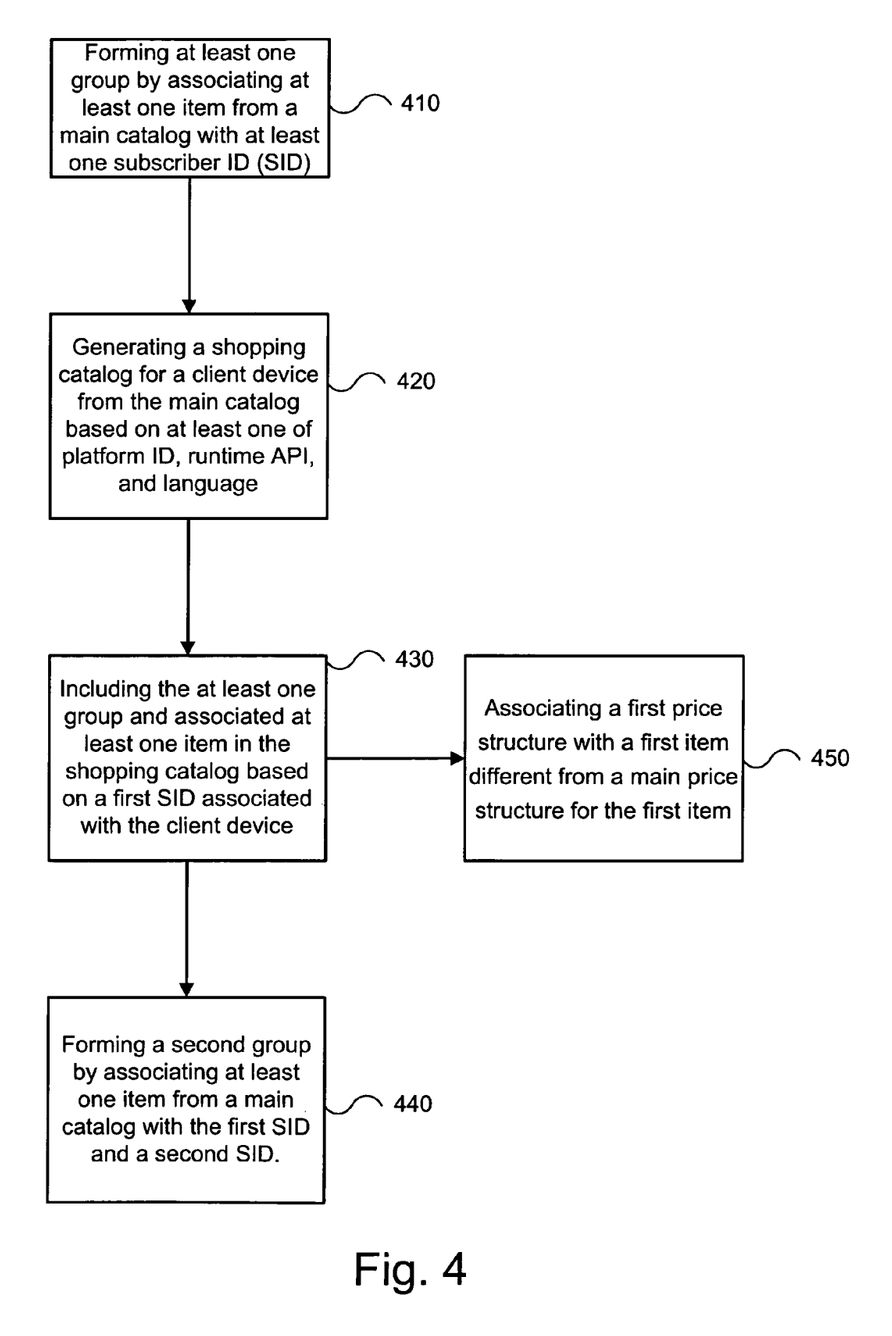
FIG. 4 illustrates at least one method of distributing items from a server catalog to a client device.

In view of the foregoing disclosure, those skilled in the art will recognize that embodiments of the invention include methods of performing the sequence of actions, operations and/or functions previously discussed. For example, as illustrated in FIG. 4, at least one embodiment includes a method of presenting and distributing items (e.g., applications/content) to wireless client device including forming at least one group by associating at least one item from a main catalog with at least one subscriber ID (SID), block 410. A shopping catalog can be generated for a first client device from the main catalog based on at least one of platform ID, runtime API, and language, block 420 Then, the at least one group and associated at least one item can be included in the shopping catalog based on a first SID associated with the first client device, 430. Accordingly, the group of applications and/or content can be formed that is directed to a SID, which can contain a subset of the applications/content available in the main catalog and can also be associated with special pricing, as discussed in the foregoing description.

Further, if there is only one SID associated with the group, that group and associated items are available to a client device associated with that SID. Therefore, applications/content can be directed to a specific subscriber with special price levels associated only with that SID. Optionally, a second group can be generated by associating at least one item from a main catalog with the first SID and a second SID, block 440. Therefore, each SID can be a member of multiple groups and each group can likewise be associated with multiple SIDs. Further, as discussed above each of these groups may have different price levels for each item, so pricing for the same item (i.e., application/content) can vary from group to group. Therefore, another embodiment of the invention can include associating a first price structure with a first item in the first group that is different from a main price structure associated with the first item in the main catalog, block 450.

Accordingly, in one non-limiting example, when an item is downloaded from a group with special pricing. The pricing structure in the group (e.g., retail pricing, provider pricing) and related download information can be used to generate a billing event that automatically can bill the subscriber (if the retail price is not zero) and credit the provider(s), in a similar manner as to the conventional systems. Since each group can have special pricing for the same item, this allows carriers and/or providers the flexibility to price the same item at specific levels for specific subscribers or groups of subscribers. For example, a corporate client having a large number of client devices may get special pricing on a suite of applications for all SIDs/client devices associated with that corporate client. Each client device which is associated with the corporate group can be presented with a listing of the suite of applications directed to members of that group along with the special pricing. Accordingly, embodiments of the invention can provide improvements in the flexibility of pricing, marketing and delivery of applications and content.

In further embodiments, those skilled in the art will appreciate that the foregoing methods can be implemented by the execution of a program embodied on a computer readable medium, such as, the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, or EEPROM), flash memory cards, an optical storage device (e.g. CD-ROM, WORM, DVD, digital optical tape), paper "punch" cards, or other suitable data storage media including digital and analog transmission media.

Accordingly, an embodiment of the invention can include a computer-readable medium on which is stored a computer program for wirelessly presenting and distributing items to a client device. The computer program comprising instructions which, when executed causes the computing device (which can include multiple computing devices) to perform the process of forming at least one group by associating at least one item from a main catalog with a first SID associated with a first client device; generating a shopping catalog can be generated for the first client device from the main catalog based on at least one of platform ID, runtime API, and language; and including the at least one group and the associated at least one item in the shopping catalog based on a first SID associated with the first client device.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although,elements of the invention may be described or claimed in the singular, the plural is contemplated unless limitation to the singular is explicitly stated.

The invention claimed is:

1. A method of distributing items to wireless client devices comprising:
    forming, at a server, at least one group by associating at least one item from a main catalog with a first subscriber ID (SID) associated with a first wireless client device;
    generating, at the server, a shopping catalog for the first wireless client device from the main catalog based on at least one of platform ID or runtime application programming interface (API) of the first wireless client device; and
    including the at least one group in the shopping catalog based on the first SID associated with the first wireless client device, wherein a first group of the at least one group is associated with only the first SID.

2. The method of claim 1, further comprising:
    forming a second group by associating at least one item from the main catalog with the first SID and a second SID associated with a second wireless client device.

3. The method of claim 1, wherein the at least one item includes a first item, the method further comprising:
    associating a first price structure with the first item in the first group that is different from a main price structure associated with the first item in the main catalog.

4. The method of claim 3, wherein the first price structure and the main price structure each includes at least one of a retail price or a content price.

5. The method of claim 4, wherein the retail price of the first item in the first group is zero and wherein the retail price of the first item in the main catalog is greater than zero.

6. The method of claim 1, further comprising:
    transmitting the shopping catalog including the at least one group to the first wireless client device.

7. The method of claim 6, further comprising:
    organizing the shopping catalog including the first group as a listing of folders, each folder containing at least one of a subfolder or an item.

8. The method of claim 1, wherein the at least one item comprises at least one of an application or content.

9. The method of claim 1, wherein the first group of the at least one group contains a first item that is only displayed via the first group and is not accessible through the main catalog.

10. The method of claim 1, wherein one group contains a first item that is contained in the main catalog and accessible via the one group but is hidden from display in the main catalog.

11. A server comprising:
    logic configured to form a first group by associating at least one item from a main catalog with a first subscriber ID (SID) associated with a first wireless client device;
    logic configured to generate a shopping catalog for the first wireless client device from the main catalog based on at least one of platform ID or runtime application programming interface (API) of the first wireless client device; and
    logic configured to include the first group in the shopping catalog based on the first SID associated with the first wireless client device, wherein the first group of at least one group is associated with only the first SID.

12. The server of claim 11, wherein a second group is formed containing the first SID and a second SID associated with a second wireless client device.

13. The server of claim 11, wherein the at least one item includes a first item, the server further comprising:
    logic configured to associate a first price structure with the first item in the first group that is different from a main price structure associated with the first item in the main catalog.

14. The server of claim 13, wherein the first price structure and the main price structure each includes at least one of a retail price or a provider price.

15. The server of claim 14, wherein the retail price of the first item in the first group is zero and wherein the retail price of the first item in the main catalog is greater than zero.

16. The server of claim 11, wherein the at least one item comprises at least one of an application or content.

17. The server of claim 11, wherein the first group of the at least one group contains a first item that is only displayed via the first group and is not accessible through the main catalog.

18. The server of claim 11, wherein one group contains a first item that is contained in the main catalog and accessible via the one group but is hidden from display in the main catalog.

19. An apparatus for distributing items to a wireless client device comprising:
    means for forming at least one group by associating at least one item from a main catalog with a first subscriber ID (SID) associated with a first wireless client device;
    means for generating a shopping catalog for the first wireless client device from the main catalog based on at least one of platform ID or runtime application programming interface (API) of the first wireless client device; and
    means for including the at least one group in the shopping catalog based on the first SID associated with the wireless client device, wherein a first group of the at least one group is associated with only the first SID.

20. The apparatus of claim 19, wherein a second group is formed by associating the at least one item from the main catalog with the first SID and a second SID associated with a second wireless client device.

21. The apparatus of claim 19, wherein the at least one item includes a first item, and further comprising:
  means for associating a first price structure with the first item in the first group that is different from a main price structure associated with the first item in the main catalog.

22. The apparatus of claim 21, wherein the first price structure and the main price structure each includes at least one of a list price or a provider price.

23. The apparatus of claim 22, wherein a retail price of the first item in the first group is zero and wherein the retail price of the first item in the main catalog is greater than zero.

24. The apparatus of claim 19, wherein the at least one group includes the first group, the apparatus further comprising:
  means for transmitting the shopping catalog, including the first group, to the first wireless client device.

25. The apparatus of claim 24, further comprising:
  means for organizing the shopping catalog, including the first group, on the first wireless client device as a listing of folders, each folder containing at least one of a subfolder or a first item.

26. A non-transitory computer-readable medium on which is stored a computer program for wirelessly presenting and distributing items to a first wireless client device, the computer program comprising instructions which, upon being executed, causes a computing device to perform a process of:
  forming at least one group by associating at least one item from a main catalog with a first subscriber ID (SID) associated with the first wireless client device;
  generating a shopping catalog for the first wireless client device from the main catalog based on at least one of platform ID or runtime application programming interface (API) of the first wireless client device; and
  including the at least one group in the shopping catalog based on the first SID associated with the first wireless client device, wherein a first group of the at least one group is associated with only the first SID.

27. The non-transitory computer-readable medium of claim 26, wherein the computer program instructions, upon being executed, further causes the computing device to perform the process of:
  forming a second group by associating the at least one item from the main catalog with the first SID and a second SID associated with a second wireless client device.

28. The non-transitory computer-readable medium of claim 27, wherein the at least one item includes a first item, and wherein the computer program instructions, upon being executed, further causes the computing device to perform the process of:
  associating a first price structure with the first item in the first group that is different from a main price structure associated with the first item in the main catalog.

* * * * *